US005586379A

United States Patent [19]

Nish

[11] Patent Number: 5,586,379
[45] Date of Patent: Dec. 24, 1996

[54] STABILIZING OF CAM IN AUTOMATED BEVERAGE FILLING MACHINERY

[75] Inventor: Terry E. Nish, Salt Lake City, Utah

[73] Assignee: Servi-Tech, Inc., Salt Lake City, Utah

[21] Appl. No.: 422,376

[22] Filed: Apr. 14, 1995

Related U.S. Application Data

[62] Division of Ser. No. 168,692, Dec. 16, 1993, abandoned.

[51] Int. Cl.[6] ................................ B23P 6/00; B23P 11/00

[52] U.S. Cl. ........................ 29/401.1; 29/402.17; 29/434; 141/147; 251/251

[58] Field of Search ............................ 29/401.1, 402.12, 29/402.14, 402.15, 434, 890.121, 890.124, 890.128; 141/144, 145, 147; 251/251, 257, 258; 74/567, 569; 384/246, 243, 244, 245, 425, 438

[56] References Cited

U.S. PATENT DOCUMENTS

| | | | |
|---|---|---|---|
| 28,622 | 6/1860 | Damon | 384/243 |
| 1,647,334 | 11/1927 | Bart | 251/257 |
| 2,880,762 | 4/1959 | Breeback | 141/147 |
| 4,032,268 | 6/1977 | Wankel | 384/425 |
| 4,889,494 | 12/1989 | Kunz | 384/246 |
| 5,036,579 | 8/1991 | Buchler | 29/434 X |
| 5,195,229 | 3/1993 | Hughes | 74/567 |

FOREIGN PATENT DOCUMENTS

| | | | |
|---|---|---|---|
| 59478 | 4/1912 | Switzerland | 74/567 |

*Primary Examiner*—S. Thomas Hughes
*Attorney, Agent, or Firm*—Foster & Foster

[57] ABSTRACT

A modified beverage fill valve cam assembly and related methods are disclosed, which provide for a quick, inexpensive, and effective solution to fill valve cam rotational eccentricity. A supplemental support is provided for the camming end of the cam which eliminates sole reliance on cantilevered support and prevents eccentric cam rotation. The supplement support comprises an end plate having an interior cone-shaped projection with contiguous mates with corresponding cone-shaped recess formed in the end edge of the camming end of the cam.

9 Claims, 3 Drawing Sheets

STABILIZING OF CAM IN AUTOMATED BEVERAGE FILLING MACHINERY

This application is a division of my U.S. patent application Ser. No. 08/168,692, filed Dec. 16, 1993, now abandoned.

FIELD OF THE INVENTION

The present invention relates generally to modification of automatic beverage filling machinery and more particularly to novel structure and methodology for stabilizing a fill valve cam to alleviate deleterious effects of eccentric cam rotation.

BACKGROUND

A cam assembly comprising a cantilevered cam is positioned above each fill valve in existing beverage filling machinery. The cam is intended to concentrically rotate to thereby open the associated fill valve at appropriate times to fill successive bottles or cans with an appropriate amount of beverage.

In the course of time, cam rotation becomes wobbly or eccentric due to wear, resulting in lack of precision in filling.

Normally, the eccentricity problem can be solved by periodically replacing the cam assembly, which is both expensive and requires substantial non-productive down time for the filling machinery, especially when considering the number of such cam assemblies in each filling machine as well as the large number of filling machines in operation.

Heretofore, it has not been possible to quickly, inexpensively, and effectively solve the above-mentioned eccentricity problem.

BRIEF SUMMARY AND OBJECTS OF THE INVENTION

In brief summary, the present invention overcomes or substantially alleviates the problems of the prior art mentioned above. A quick, inexpensive and effective solution to fill valve cam rotational eccentricity is provided. Without cam or cam assembly replacement, the assembly support for the cam is changed from cantilevered support to include an additional concentricity preserving support.

The additional support accommodates ease of and long term rotation of the cam relative to the cam assembly. Preferably, the additional support comprises a male bushing which contiguously mates with a female recess in one end of the cam. The male/female support arrangement is preferably constructed to be self-centering, with the additional support being non-rotatably carried by the cam assembly.

With the foregoing in mind, it is a primary object of the present invention to provide a novel system and related methods for stabilizing a cam in an automatic beverage filling machine to overcome or substantially alleviate problems of the prior art.

It is another principal object of the present invention to provide a novel system and related methods for stabilizing a cam in an automatic beverage filling machine against eccentric rotation, notwithstanding wear.

An additional dominant object of the present invention is to provide a quick, inexpensive, and effective solution to fill valve cam rotational eccentricity.

An additional important object of the present invention is the provision of an adapter by which cam or cam assembly replacement in automatic beverage filling machinery due to eccentric cam rotation can be avoided.

It is a further paramount object of the present invention to provide an adapter for preventing eccentric cam rotation in an automatic beverage filling machine.

A further object of the present invention is the provision of a novel support for a beverage filling cam.

An additional object of significance is the provision of an additional support for a beverage filling cam which eliminates the traditional cantilever construction.

An additional object of significance is the provision of a modified cam assembly for an automatic beverage filling machine which accommodates ease of and long term rotation of the cam relative to the remainder of the cam assembly.

An additional valuable object of the present invention is the provision of an additional support for a beverage filling cam which additional support comprises a male bushing to contiguously mate with a female recess in one end of the beverage filling cam;

An additional dominant object of the present invention is the provision of a novel male/female support system for a beverage filling cam which is self-centering.

These and other objects and features of the present invention will be apparent from the detailed description taken with reference to the accompanying drawings.

DETAILED DESCRIPTION OF THE ILLUSTRATED EMBODIMENT

Reference is now made to the drawings wherein like numerals are used to designate like parts throughout. The Figures illustrate a modified cam assembly, forming a part of an automatic beverage filling machine. Since the cam assembly is primarily conventional, except as otherwise explained herein, an extensive description is not necessary since those skilled in the art are well acquainted with standard fill valve cam assemblies. Furthermore, the well known and conventional interrelationship between such cam assemblies and beverage fill valves per se is well understood by those skilled in the art, no explanation is needed as to the structural and operational relationship between such cam assemblies and the fill valves which are operated by rotation of the cam of the cam assemblies.

Figure 1:
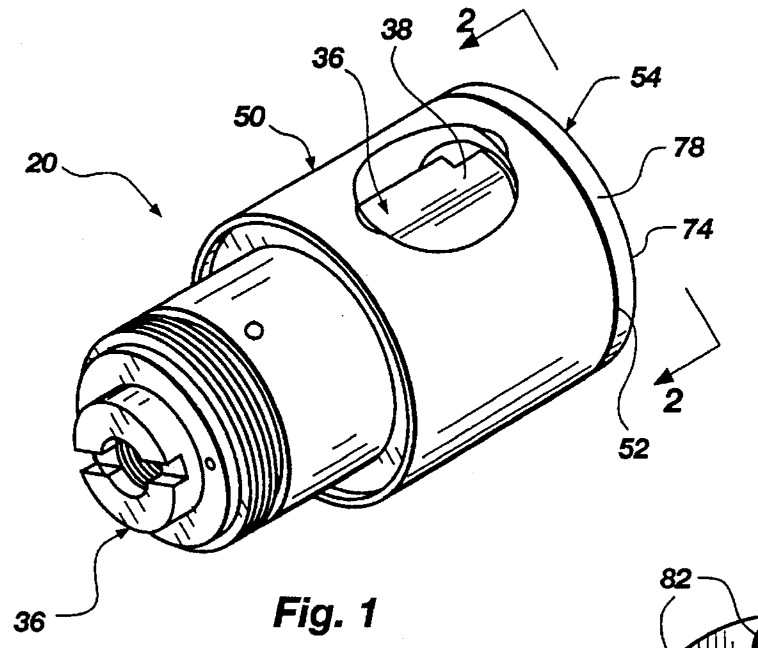
FIG. 1 is a perspective representation of a fill valve cam assembly, modified in accordance with the principles of the present invention.
Figure 2:
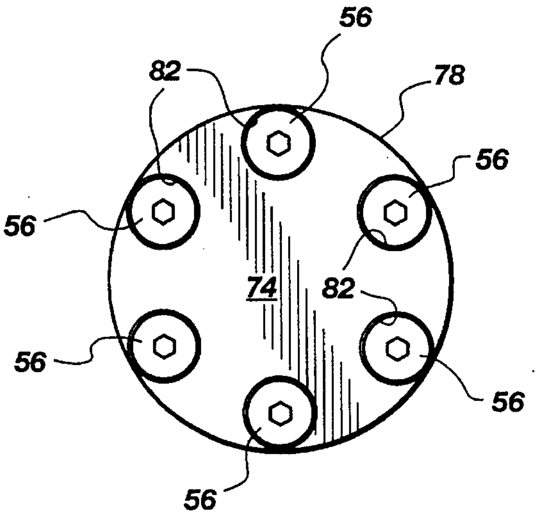
FIG. 2 is an end view taken along lines 2—2 of FIG. 2.
Figure 3:
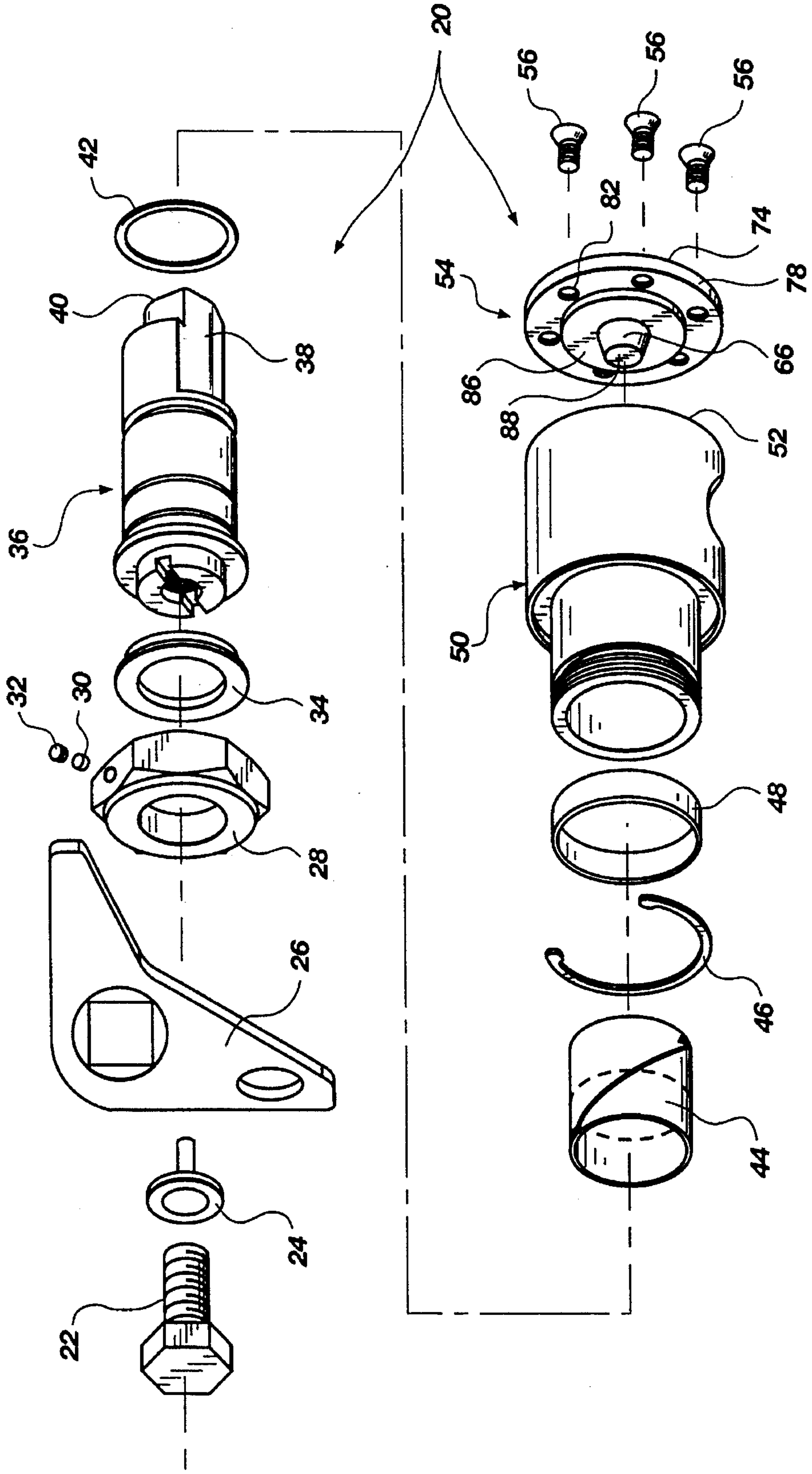
FIG. 3 is an exploded perspective of the cam assembly of FIG. 1.

Specifically, the cam assembly illustrated in its assembled condition in FIG. 1 and in its disassembled condition in FIG. 3, is generally designated 20. Conventionally the cam assembly 20 comprises a hexagonal head screw 22, preferably equipped with a grease hole, a sheer washer 24, and a fill valve operating lever 26. Continuing the description of the conventional parts of the cam assembly 20 seriatim from proximal to distal end, the assembly 20 comprises a valve operating cam retainer nut 28, equipped with a side washer 30 and set screw 32. The assembly 20 further comprises a thrust washer 34 and a valve operating cam, generally designated 36, the distal end 38 of which is modified, in accordance with the principles of the present invention, to provide additional support for the cam 36. The modification is specifically at the end edge or face 40 of the camming end 38 of cam 36.

The cam assembly 20 further comprises a Viton O-ring 42, a retainer bearing liner 44, a Tru-Arc retaining ring 46, and a valve operating cam retainer seal 48, all of which are mounted upon the cam 36.

The cam assembly 20 further comprises a cam housing, generally designated 50, the distal end edge 52 of which has been modified in accordance with the principles of the present invention.

In accordance with the principles of the present invention, the cam assembly 20 comprises a novel end support plate, generally designated 54, which is non-rotatably secured to the end edge 52 of the cam housing 50 by countersunk set screws 56.

As can be clearly seen from comparison of FIGS. 1 and 3, elements 22, 24, 26, 28, 30, 32, and 34 are not illustrated in FIG. 1, for ease of presentation.

Figure 4:
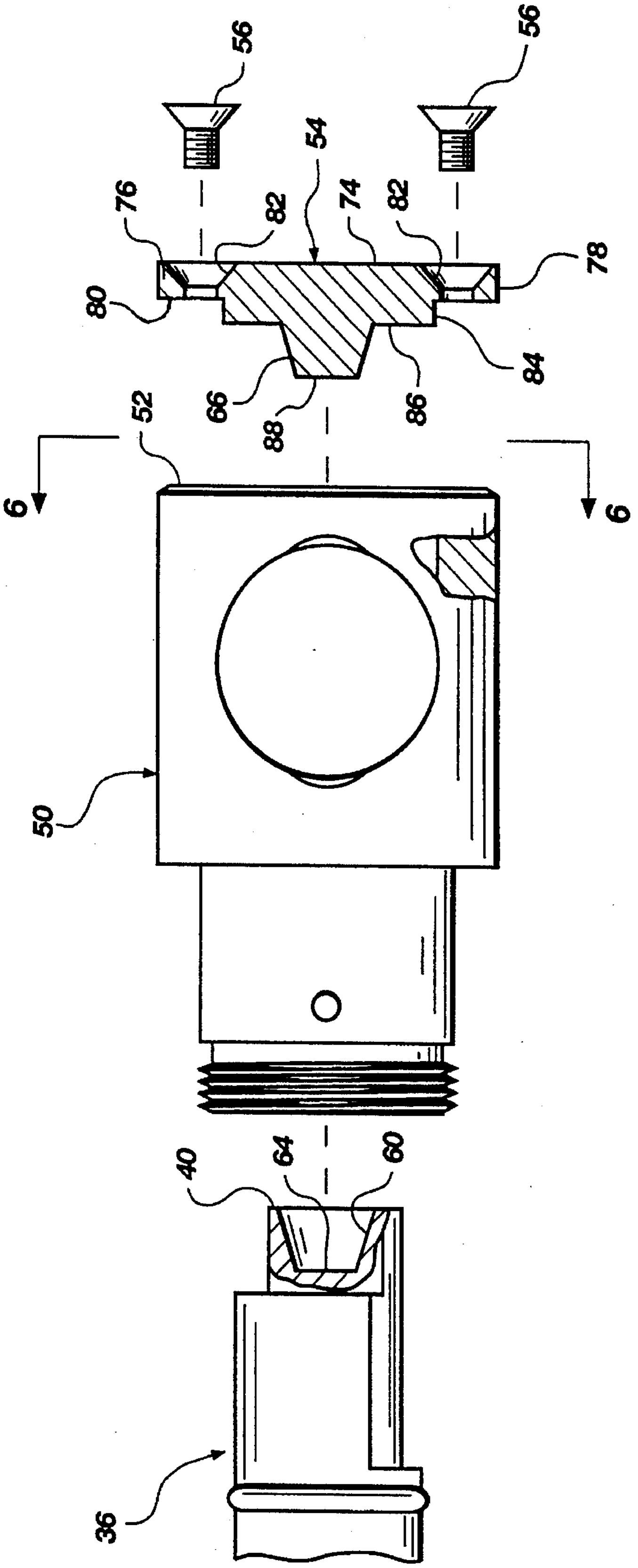
FIG. 4 is an enlarged exploded side elevation of a portion of the assembly of FIG. 1 illustrating the rotational eccentricity modifications made thereto in accordance with the present invention.

As indicated above, the cam 36 is conventional and intended to be representative of any conventional cam, as is cam assembly 20, with the exception that distal end edge 40 is modified, as illustrated in FIG. 4. Specifically, a cone-shaped recess 60 is machined into cam end edge 40 so as to be symmetrical in its configuration and precisely aligned with the longitudinal axis of cam 36. Cone-shaped tapered recess 60 terminates in a small circular bottom wall surface 64, as illustrated in FIG. 4. The size, location, and shape of recess 60 is selected to match the size, shape, and alignment of male projection 66 forming an integral part of end support plate 54, as explained in greater detail hereinafter.

Figure 6:
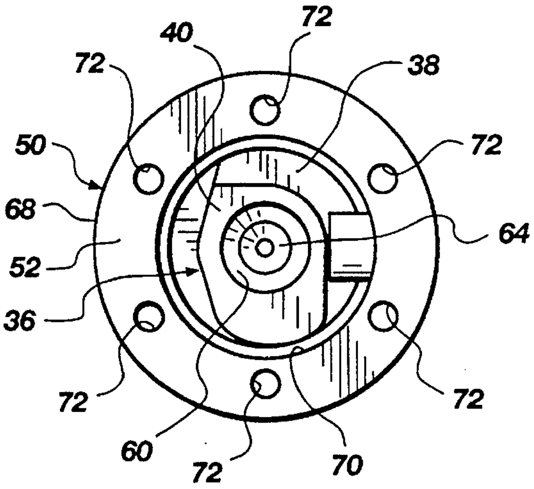
FIG. 6 is an end view taking along lines 6—6 of FIG. 4.

It is to be appreciated, as is readily apparent from an inspection of FIG. 6, that the distal end 38 of the cam 36 comprises a plurality of lobes, with end edge 40 being asymmetric.

The distal end edge 52 of housing 50 is best illustrated in FIG. 6. End edge 52 is annular, being disposed between an outside cylindrical surface 68 and an inside cylindrical surface 70, defining a hollow region of the housing 50 in which camming end 38 is disposed. Annular end edge surface 52 has a plurality of threaded blind bores 72 there exposed. The threaded blind bores 72 are disposed at 60 degree intervals along the annular surface 52.

Figure 5:
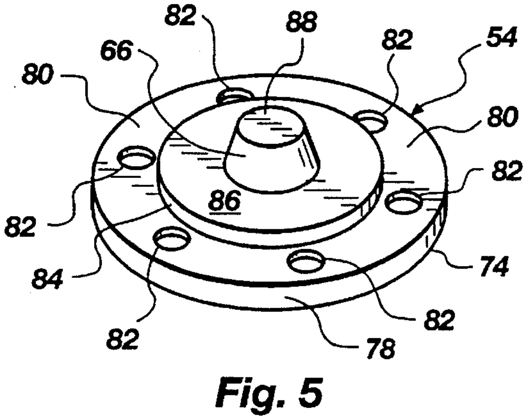
FIG. 5 is an enlarged perspective of the additional support structure added to the cam assembly to provide for concentric cam rotation.

The end support plate 54 is best illustrated in FIGS. 3 through 5 and comprises an exposed distal surface 74. Surface 74 forms a part of a radially directed flange 76, which comprises a peripheral edge 78 and a radially directed annular surface 80. An array of countersunk apertures 82 extend between surfaces 74 and 80 near edge 78. The diameter of edge 78 is substantially the same as the diameter of surface 68, while the location and placement of apertures 82 is selected to match the threaded bores 72 in annular surface 52 of housing 50.

Annular radially directed surface 80 merges with a shoulder 84, the diameter of which is less than the diameter of cylindrical surface 70 to accommodate insertion into the interior of the housing 50, in a manner illustrated best in FIG. 1. Shoulder 84 merges with a reduced diameter radially directed surface 86, which, in the assembled condition, contiguously rests on end edge 40 of the camming end 38 of cam 36.

The conically-shaped projection-66 centrally merges with surface 86 and terminates in a blunt edge surface 88. Surface 88 is annular and comprises a diameter generally the same as the diameter of surface 64 of tapered recess 60. Similarly, the size and shape of projection 66 preferably precisely matches the size and shape of recess 60 so that when projection 66 is fitted into recess 60, the two are snugly contiguous so that the surface defining recess 60 rotates upon the surface defining projection 66 as the cam 36 is rotated, thereby preserving concentricity of the cam 36 during such rotation.

As should be readily apparent, the contiguous relationship between projection 66 and recess 60 is accomplished and retained by inserting countersunk screws 56 through apertures 82 in the end support plate 54 and threading each into the associated threaded blind bore 72 to accomplish the assembled condition illustrated in FIG. 1.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A method for modifying an automatic beverage filling machine to insure accurate filling of successive containers comprising the steps of:

(a) providing a cam comprising a cantilevered end forming part of a cam assembly for a fill valve of the automatic beverage filling machine;

(b) fabricating one bearing segment at the cantilevered end of the cam;

(c) fabricating a second matching bearing segment as a separate piece;

(d) placing the two bearing segments into mating contiguous rotatable relation within a cam housing of the cam assembly;

(e) non-rotatably securing the second bearing segment to the cam housing so as to retain the mating contiguous rotatable relationship between the two bearing segments.

2. A method according to claim 1 wherein the fabricating step (b) comprises machining a tapered blind bore in the cantilevered end of the cam in alignment with a longitudinal axis of the cam.

3. A method according to claim 1 wherein the fabricating step (e) comprises forming a male projection at one surface of the second bearing segment sized, shaped, and positioned to be contiguously, matingly, and rotatably received in a female recess comprising the one bearing segment.

4. A method of forming a hybrid cam assembly of a fill valve, comprising the steps of:

(a) forming a hybrid cam assembly of a fill valve, which cam assembly comprises a housing, a first end, and a second normally-cantilevered end, by modifying the second end to comprise an end bearing so as to convert said second end to a non-cantilevered end;

(b) forming an end support as a second part of the bearing assembly and interposing the end support between the modified second end and the housing so that the two parts of the bearing assembly are in retained relatively rotatable mating contiguous relation.

5. A method according to claim 4 wherein the forming step (a) comprises creating a female recess in the second end of the cam.

6. A method according to claim 4 wherein the forming step (b) comprises creating a male projection at one surface of the end support.

7. A method according to claim 4 wherein two forming steps (a) and (b) collectively comprise creating male and female frustro-conical matching surfaces at the second end and at the end support.

8. A method according to claim 4 further comprising the step of closing one end of the cam housing with the end support and fastening the end support to the cam housing.

9. A method for modifying a fill valve cam assembly comprising a cantilevered cam to alleviate eccentric cam rotation, comprising the steps of:

fabricating a site at a fill valve camming end of the cam for contiguously receiving supplemental cam assembly support;

non-rotatably connecting a supplemental support to the cam assembly adjacent the site causing the supplemental support to contiguously and rotatably engage the site to alleviate eccentric cam rotation.

* * * * *